(12) United States Patent
Murali et al.

(10) Patent No.: US 11,537,190 B2
(45) Date of Patent: Dec. 27, 2022

(54) DUAL PROCESSOR SYSTEM FOR REDUCED POWER APPLICATION PROCESSING

(71) Applicant: Silicon Laboratories Inc., Austin, TX (US)

(72) Inventors: Partha Sarathy Murali, Sunnyvale, CA (US); Subba Reddy Kallam, Sunnyvale, CA (US); Venkat Mattela, San Jose, CA (US)

(73) Assignee: Silicon Laboratories Inc., Austin, TX (US)

( * ) Notice: Subject to any disclaimer, the term of this patent is extended or adjusted under 35 U.S.C. 154(b) by 143 days.

(21) Appl. No.: 17/006,813

(22) Filed: Aug. 29, 2020

(65) Prior Publication Data
US 2021/0072813 A1    Mar. 11, 2021

Related U.S. Application Data

(60) Provisional application No. 62/899,083, filed on Sep. 11, 2019, provisional application No. 62/899,082, filed on Sep. 11, 2019.

(51) Int. Cl.
| | |
|---|---|
| *G06F 1/32* | (2019.01) |
| *G06F 1/3228* | (2019.01) |
| *G06F 1/3234* | (2019.01) |
| *G06F 9/54* | (2006.01) |
| *H04W 4/12* | (2009.01) |

(Continued)

(52) U.S. Cl.
CPC .......... *G06F 1/3228* (2013.01); *G06F 1/3243* (2013.01); *G06F 9/445* (2013.01); *G06F 9/542* (2013.01); *H04B 1/0028* (2013.01); *H04B 1/0458* (2013.01); *H04B 1/0483* (2013.01); *H04L 51/58* (2022.05); *H04W 4/12* (2013.01); *H04W 4/80* (2018.02); *G06F 1/3203* (2013.01); *H04B 2001/0408* (2013.01); *H04L 2101/622* (2022.05)

(58) Field of Classification Search
CPC ...... G06F 1/3228; G06F 1/3243; G06F 9/445; G06F 9/542; G06F 1/3293; H04B 1/0028; H04B 1/0458; H04B 1/0483; H04B 2001/0408; H04L 51/38; H04L 61/6022; H04W 4/12; H04W 4/80; Y02D 10/00
USPC ........................................................ 713/320
See application file for complete search history.

(56) References Cited

U.S. PATENT DOCUMENTS

| | | | |
|---|---|---|---|
| 10,079,788 B2 * | 9/2018 | Park | G06F 1/3209 |
| 10,104,171 B1 * | 10/2018 | Savic | G06F 9/544 |

(Continued)

*Primary Examiner* — Volvick Derose
(74) *Attorney, Agent, or Firm* — File-EE-Patents.com; Jay A. Chesavage

(57) ABSTRACT

A task processor has a low power connectivity processor and a high performance applications processor. Software processes have a component operative on a connectivity processor and a component operative on an applications processor. The low power connectivity processor is coupled to a low power front end for wireless packets and the high performance applications processor is coupled to a high performance front end. A power controller is coupled to the low power front end and enables the applications processor and high performance front end when wireless packets which require greater processing capacity are received, and removes power from the applications processor and high performance front end at other times.

21 Claims, 4 Drawing Sheets

(51) Int. Cl.

|  |  |
|---|---|
| *H04W 4/80* | (2018.01) |
| *G06F 9/445* | (2018.01) |
| *H04B 1/00* | (2006.01) |
| *H04B 1/04* | (2006.01) |
| *H04L 51/58* | (2022.01) |
| *H04L 101/622* | (2022.01) |
| *G06F 1/3203* | (2019.01) |

(56) References Cited

U.S. PATENT DOCUMENTS

| | | | |
|---|---|---|---|
| 10,353,456 B2* | 7/2019 | Li | G06F 1/324 |
| 10,628,172 B2* | 4/2020 | Kulkarni | H04L 29/06183 |
| 10,678,494 B2* | 6/2020 | Gupta | G06F 3/165 |
| 10,928,372 B2* | 2/2021 | McMillan | G08B 21/12 |
| 2010/0312188 A1* | 12/2010 | Robertson | A61B 5/332 |
| | | | 600/300 |
| 2014/0215236 A1* | 7/2014 | Heinrich | G06F 9/4893 |
| | | | 713/320 |
| 2016/0132369 A1* | 5/2016 | Lee | G06F 9/5094 |
| | | | 713/323 |
| 2018/0074575 A1* | 3/2018 | Link, II | G06F 1/3209 |
| 2018/0314314 A1* | 11/2018 | Link, II | G06F 1/3246 |
| 2018/0329050 A1* | 11/2018 | Amihood | G01S 13/18 |
| 2019/0155784 A1* | 5/2019 | Park | G06F 1/3293 |
| 2019/0261274 A1* | 8/2019 | Huang | H04W 52/0229 |
| 2021/0064110 A1* | 3/2021 | Gendler | G06F 1/3296 |
| 2022/0077569 A1* | 3/2022 | Himath | H01Q 3/005 |

* cited by examiner

200 Connection architecture

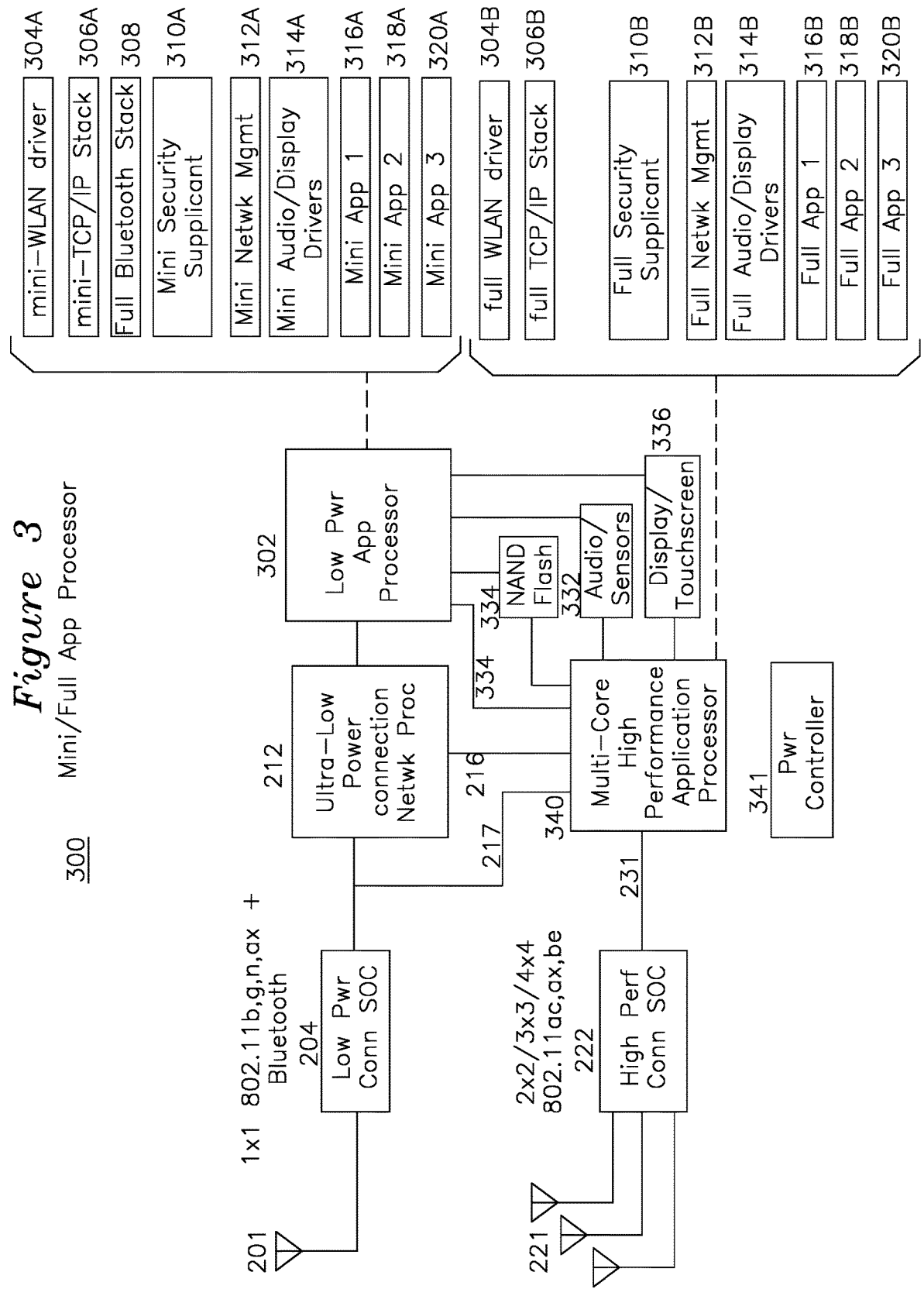

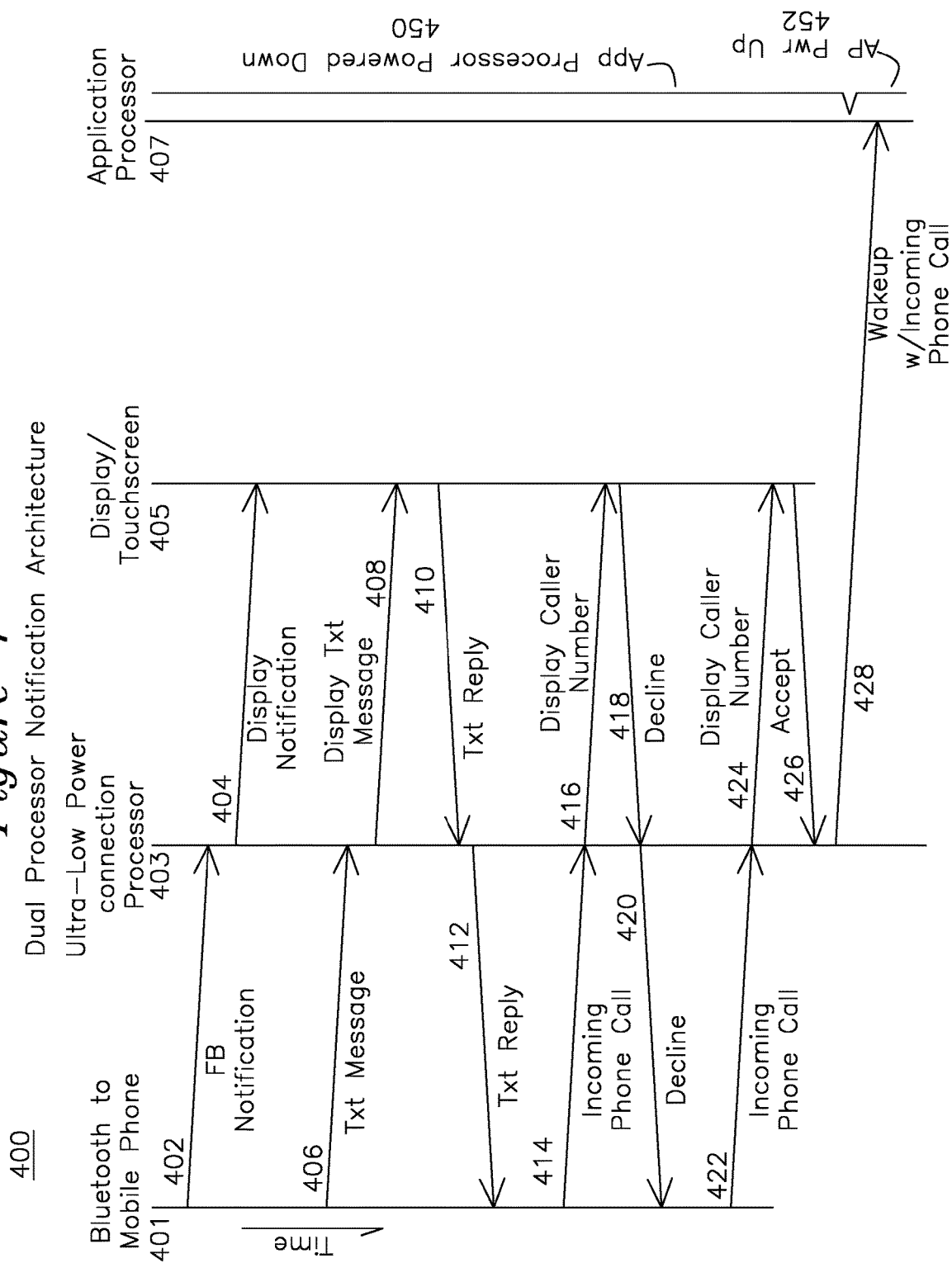

DUAL PROCESSOR SYSTEM FOR REDUCED POWER APPLICATION PROCESSING

The present invention claims priority to U.S. provisional patent application Ser. No. 62/899,082 filed Sep. 11, 2019 and provisional patent application Ser. No. 62/899,083 filed Sep. 11, 2019.

FIELD OF THE INVENTION

The present invention relates to a system for reducing power consumption in portable electronics to extend battery life. In particular, the invention relates to power savings system for mobile communications devices such as a mobile phone over 4G or LTE connection, or a wearable electronic device such as a watch coupled to a communications system such as a mobile phone via Bluetooth or wireless local area network (WLAN).

BACKGROUND OF THE INVENTION

As wireless communication devices grow in popularity, there is increased desire for greater functional capability. Mobile telephones and wearable electronics are now expected to support applications, most of which provide notifications of incoming messages, status changes, the capability to perform computationally intensive tasks.

Mobile devices often use a single multi-core advanced architecture processor coupled to an RF front end, and the multi-core processor is placed in a sleep state until the arrival of a task to be processed. Some tasks, such as a notification of an incoming telephone call, text message, or social media notification, require very little Central Processing Unit (CPU) processing, comprising in one example a Transmission Control Packet (TCP) of the Internet Protocol (IP), or a Bluetooth (www.Bluetooth.org) packet which is directed to a particular running application for control or delivery of status information to the application process. The user may respond to this notification by mere acknowledgement or take no action in the case of a text message or phone call, or may respond by launching an application to respond or answer the call, or launch a social media application for response. An ignored notification requires only the CPU capacity to display that the notification occurred, whereas an application which provides an encrypted reply or stream of communication requires significantly greater CPU capacity, and several such notifications and responses may occur simultaneously. Alternatively, the mobile or wearable user may launch an application on a watch or mobile phone which requires minimal or significant CPU capability, for which the device must have available the required CPU capability to meet the requested task computational or communications demand.

As the mobile and wearable processor applications expand in scope and number, larger CPUs (also known as processors) have been used to handle these tasks, including multiple core processors, where each core is assigned one or more of the various incoming or response tasks.

Higher capacity CPUs have associated greater power consumption and shortened battery life, and accordingly, a variety of different methods are used to reduce power consumption in these applications. In one method, a high capacity CPU is used to handle all tasks, and the high capacity CPU is placed in a low power standby mode when there is not an incoming task to process. A drawback of this method is that the higher power consumption occurs whenever a notification is received, and results in a power consumption penalty proportional to the power required by the excess CPU capability when many such notifications are received and not acted upon, or require only minimal CPU capacity.

A communication system architecture and processor architecture for portable electronics is needed which optimizes power consumption for CPU intensive and non-intensive tasks which may be received by portable communication devices such as mobile phones and wearable communication devices such as smart watches.

OBJECTS OF THE INVENTION

A first object of the invention is a power optimizing communication system having a low power front end comprising a baseband processor operative to receive wireless packets coupled to a Media Access Controller (MAC), the MAC coupled to a connectivity processor for handling low speed connections such as Bluetooth or 1×1 WLAN (non-MIMO WLAN), the low power connectivity processor coupled to an application processor, the application processor also coupled to a high performance front end for receiving high speed wireless packets such as for MIMO communications, the low power front end and connectivity processor exclusively enabled to provide wireless network connectivity based on connection speed or number of socket requirements.

A second object of the invention is a flexible applications processor having a low power connectivity processor and a high performance applications processor, the low power applications processor handling tasks within the capacity of the low power applications processor, the low power applications processor coupled to the high performance applications processor and enabling the high performance applications processor to handle tasks beyond the capability of the low power applications processor, or which would consume more energy than if completed on the low power applications processor.

A third object of the invention is a method for wireless communications operative on a communications system comprising a low power front end comprising a first baseband processor and a first Media Access Controller (MAC) coupled to a low power connectivity processor operative to process wireless packets, a performance front end comprising a second baseband processor and a second MAC coupled to an applications processor, and a power controller coupled to the low power connectivity processor and to the applications processor, the method comprising:

receiving a wireless packet on the first MAC;
examining a packet type field provided by the first MAC;
enabling power to the applications processor and performance front end only when the packet type field matches a performance packet type associated with a computational complexity greater than the low power connectivity processor can process, and not enabling power to the applications processor and performance front end when the packet type field does not match the performance packet type.

A fourth object of the invention is a task processor comprising:

a low power connectivity processor operative to process wireless packets;
a low power front end comprising a first baseband processor operative to receive wireless packets coupled to a first Media Access Controller (MAC);
an applications processor;

a performance front end comprising a second baseband processor operative to receive wireless packets coupled to a second MAC;

a power controller coupled to the low power connectivity processor and to the applications processor;

a plurality of tasks, each task having a connectivity processor component operative to execute on the connectivity processor and provide a notification and an application component operative to execute on the application processor and perform a task associated with the notification.

SUMMARY OF THE INVENTION

A communications processor has a low power connectivity processor and a high performance applications processor, whereby the low power connectivity processor may be a single core connectivity processor which has less than 1/10 the processing capability and less than 1/3 the power consumption of the application processor. The connectivity processor is typically a network processor or microcontroller with a small number of pipelined stages such as 3 or 5 which are operative to execute programs instructions directly from low power memory such as execute in place (XIP) NOR flash which favors low power consumption over performance. The application processor is typically a high performance multi-core processor with a greater number of pipelined stages such as 7 or more and which is operative to execute program instructions from high speed memory such as synchronous dynamic random access memory (SDRAM), where the high performance application processor handles computationally intensive networking tasks. The handoff from connectivity processor to application processor may be accomplished by having the connectivity processor partially respond to the incoming wireless packet and hand off the communication context to the application processor. Additionally, tasks or processes may have a connectivity processor component for notifications and other simple tasks such as showing a message that a new text message has arrived, and have a companion application processor component for higher complexity responses such as composing text messages. The connectivity processor may be coupled to a low power front end for receiving and transmitting SISO wireless packets, and the application processor may be coupled to the low power front end as well as a performance front end for MIMO communications. The performance front end and high performance applications processor may be maintained in a powerdown state until needed, such as by detection of a certain type of packet by the connectivity processor, or a process or task operative on the connectivity processor, such as through a power controller which is responsible for providing power to the applications processor and performance front end when needed. The power controller may make a determination on enabling the performance front end or the applications processor based on a packet type, wireless packet transmission data rate, wireless packet reception data rate, or other metric which may also utilize a threshold. The packet types may be classified as a first class of packet such as a Bluetooth packet or a SISO wireless protocol packet, and a second class of packet including MIMO high speed communication protocols such as packets compatible with the IEEE standards 802.11n, 802.11ac, 802.11ax, or 802.11be.

In one aspect of the invention, a communications system comprises the connectivity processor performing low level networking tasks including WLAN media access controller (layer 2 data link MAC) functions as well as layer 3 TCP network layer including retransmission requests for missing or out of sequence packets on receive and unacknowledged packets on transmit. Optionally, security functions such as WLAN authentication or TLS may be performed by the low power connectivity processor or they may be handed off to the high performance application processor after the application processor wakes up, thereafter the application processor disabling itself when the computationally intensive task completes, leaving the low power connectivity processor to handle subsequent tasks which do not require the computational capability of the application processor.

A communication system has a low power front end for receiving wireless packets for delivery to a low power connectivity processor which can be enabled to transmit and receive packets using a low power RF front end, Baseband Processor, and MAC, which are collectively known as a low power connectivity subsystem or SOC for handling lower capacity WLAN communications and Bluetooth communications. Examples of higher capacity WLAN communications include Multiple Input Multiple Output (MIMO) communications, such as the communications protocols described in 802.11n, 802.11ac, 802.11ax, and others. Non-MIMO communications use a single stream of data, and includes protocols such as 802.11, 802.11b, 802.11a, 802.11j 802.11p, 802.11y, and others, which may be collectively referred to as Single Input Single Output (SISO) communications. The low power RF front end, Baseband processor, and Media Access Controller (MAC) of the low power connectivity SOC may be configured to handle Bluetooth and/or WLAN packets.

The communication system also has a high performance application processor which can be enabled and coupled to a high performance RF front end, Baseband Processor, and MAC (known as a high performance connectivity SOC) for handling high capacity communications such as WLAN 2×2, 3×3, and 4×4 MIMO, or Long Term Evolution (LTE) mobile wireless or third generation (3G) or fourth generation (4G) mobile wireless protocols, or any combination of WLAN, Bluetooth, LTE, 3G, 4G, and Zigbee (zigbeealliance.org). The communication system adaptively enables combinations of an associated low power RF front end, low power connectivity processor, high performance RF front end, and high performance application processor depending on the class of communication protocol and performance required for that particular class of communication protocol.

Optimal power savings are achieved where certain wireless communications are adaptively processed by the low power RF front end and low power connectivity processor for certain types of communications which do not require significant computational resources, and other wireless communications with significant computational resource requirements are processed by the high performance RF front end and high performance applications processor for only the protocols which require the greater capacity and associated greater power consumption associated with the high performance connectivity SOC or applications processor.

BRIEF DESCRIPTION OF THE DRAWINGS

FIG. 3 shows a block diagram for a power saving communications system.

FIG. 4 shows a time diagram for example processing of packets.

DETAILED DESCRIPTION OF THE INVENTION

Figure 1:
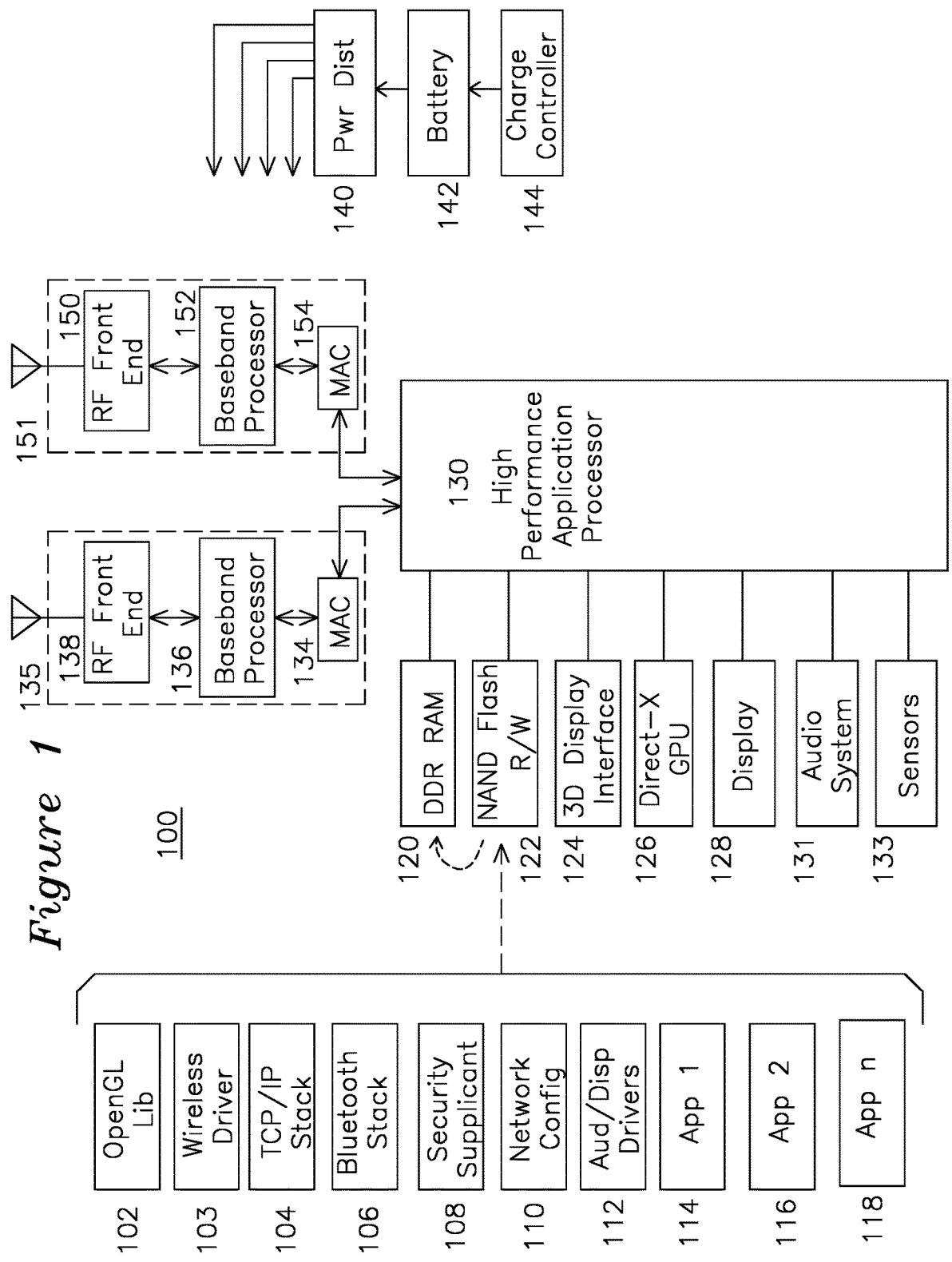
FIG. 1 shows a block diagram for a communication system.

FIG. 1 shows an example communication system for portable electronics. A high performance application processor 130 is coupled to high performance Double Data Rate (DDR) memory 120 for program execution, high performance NAND architecture flash 122 for program storage, a display interface 124 for high quality graphics, a graphical processing unit 126 for fast rendering, and a display/touchscreen 128. The high performance application processor 130 is also coupled to a first transceiver 135 and second RF transceiver 151 for receiving and transmitting packets. The first transceiver 135 is typically any of a Bluetooth, WLAN, Zigbee, LTE, 3G, 4G, or other wireless protocol interface, and the second transceiver 151 is a wireless protocol interface for a different protocol than the first transceiver. Typically, one of the transceivers is WLAN or Bluetooth, and the second transceiver is a wireless telephone protocol such as LTE, 3G, or 4G for providing simultaneous connectivity to each type of protocol.

A battery 142 is managed by a power distribution 140, which selectively enables various subsystems as required to manage power consumption, and a charge controller 144 manages the rate of charge from an external power source (not shown) to battery 142.

The NAND flash 122 provides persistent storage for a variety of executable instructions known as programs, tasks, or processes which are executed by high performance application processor 130. Typical programs and processes which are saved in NAND flash 122 are the openGL graphical library 102, wireless drivers 103, TCP/IP stack 104, Bluetooth stack 106, security functions 108 for WLAN and TCP, network configuration details 110, audio, display, and other device drivers 112 associated with instructions specific to hardware and which are either provided by the hardware manufacturer or integrated into the operating system for the application processor 130, and user-downloaded applications of which there may be many types, shown as 114, 116, and 118.

Users of mobile electronics have come to expect the rich functionality provided by the architecture of FIG. 1, and the largest deployment of such devices re smartphones.

As wearable electronics such as watches and virtual reality glasses (augmented reality AR and virtual reality VR) become more popular, it is desired to provide a similarly rich user experience and maximizing the battery 142 life of the wearable device. A particular impediment to this trajectory is battery 142 capacity and size. The huge packaging size reduction from a mobile phone to a watch or VR/AR glasses can be scaled for the microelectronic integrated circuits, which can be packaged more compactly. However, in a typical mobile smartphone, the battery is half of the package volume, and governs the usable interval between charges. In exchange for rich functionality, mobile phone users are content to exchange small size for a single day of use (or less) between recharging events. Even the "low power mode" of smartphones (a mode typically enabled when the remaining charge of the battery reaches below 20% of full capacity) is not sufficient for these new uses. As wearable electronics scale to smaller and smaller sizes, a different communications and processing architecture and system is required.

Figure 2:
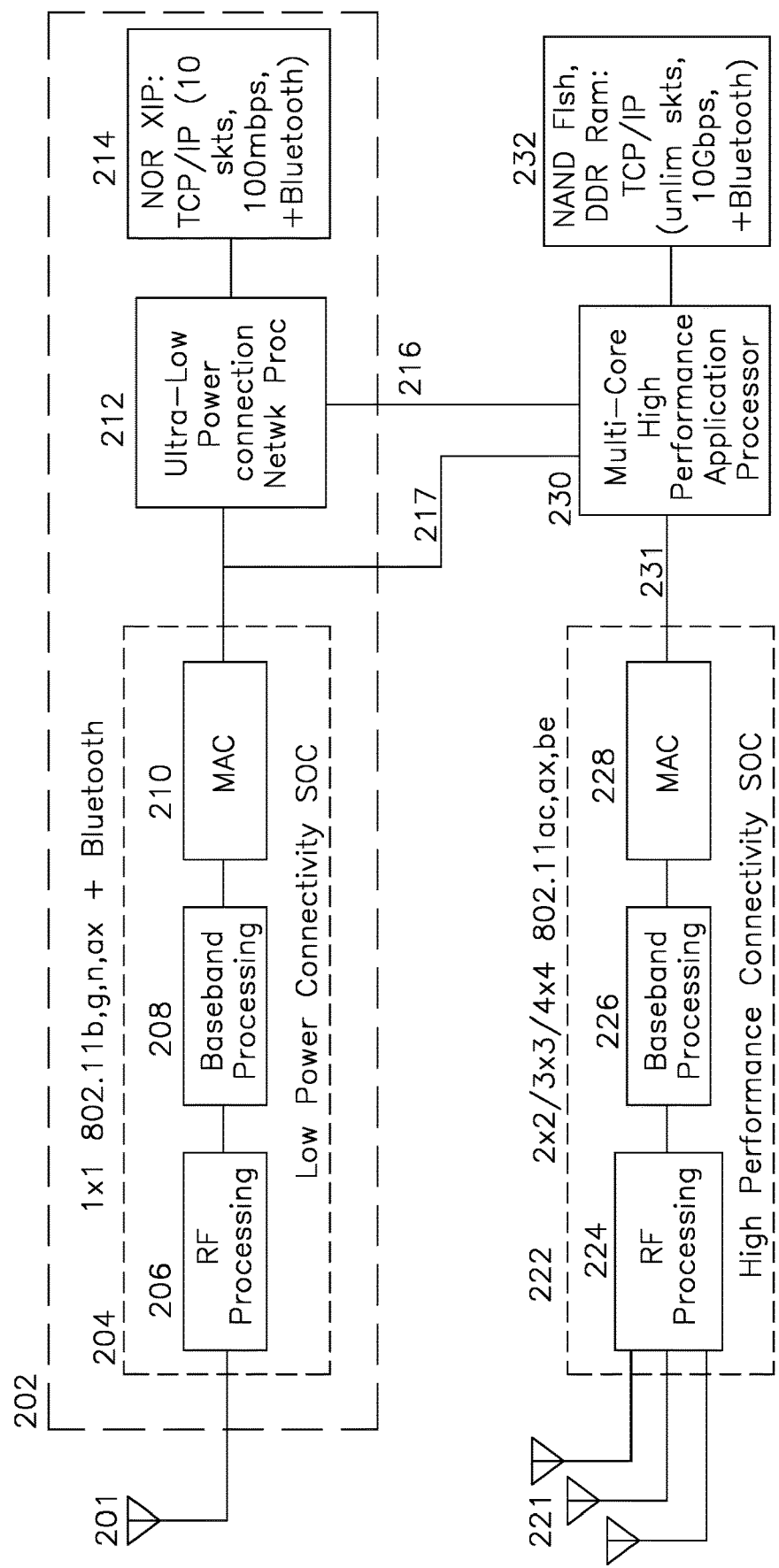
FIG. 2 shows a block diagram for an adaptive communication system.

FIG. 2 shows an alternative connection architecture and communication system 200, where the receiver system 202 with low power connectivity front end 204 (which may be an SOC) and high performance connectivity front end 222. Each low power connectivity front end 204 and high performance connectivity front end 222 is typically operative on the same communications protocol, but operate exclusively from each other depending on protocol type. The low power connectivity front end 204 comprises RF processing 206 receiving and transmitting wireless packets, coupled to baseband processing 208 which is specific to the particular communications protocols it supports, and media access controller (MAC) 210 which provides a digital interface 217 for receiving and transmitting data. Similarly, the performance front end comprises RF processing 224 which may support MIMO with multiple antennas 221, which is coupled to baseband processing 226 which provides more sophisticated signal processing for MIMO and high data rate modulation and demodulation, and high speed media access controller (MAC) 228 with digital interface 231. First low power connectivity front end 204, and low power connectivity processor 212 are optimized for low power consumption and provide minimal functionality for a particular communication protocol. An example low power connectivity processor 212 is an ARM® processor, or a Cortex-M® series processor, both licensed by Arm Holdings (www.arm.com), or a microcontroller architecture based on the open source RISC-V (www.riscv.org). For example use with WLAN, low power connectivity front end 204 SOC is operative for single channel (non-MIMO or SISO) modes with data rates on the order of 10 Mbps to 100 Mbps, which are at least a factor of 10 lower than the high performance connectivity of performance front end (or SOC) 222. By contrast, the high performance connectivity front end 222 will provide the capacity of a much higher bandwidth capacity protocol, such as 2×2 MIMO or 3×3 MIMO, or the IEEE protocols 802.11n, 802.11ac, 802.11ax, or 802.11be MIMO approaching 1 Gbps data rate capacity or more. In one example of the invention, the selection of the performance front end is made on a performance packet type, where a performance packet type is one with a maximum available data transfer rate in excess of 10 Mbps or alternatively, in excess of 100 Mbps. When enabled, the high performance connectivity front end 222 will require greater power associated with the faster clocking rates associated with higher data rates. High performance front end 222 typically supports 2×2, 3×3 MIMO of current standards, and 4×4 MIMO in the future. The high performance connectivity front end (or SOC) 222 and application processor 230 may be operative to support a channel bandwidth of 80 Mhz and data throughput ranges on the order of a gigabit per second, transitioning to 10 Gbps in the future over a 160 Mhz channel. The application processor is typically coupled to block read NAND flash, which copies instructions to high speed double data rate (DDR) RAM, which is sufficiently sized to provide data buffers for high speed TCP/IP data transmission and reception, shown collectively as block 232.

When the high performance application processor 230 is enabled, data bus 216 may couple data from connectivity processor 212 or via data bus 217 from the low power connectivity front end (or SOC) 204. The flexibility of data paths 217 and 216 allow the application processor 230 to handle MAC layer data directly, or via path 216 to accept data flows such as TCP traffic or Bluetooth traffic (for 204 in a Bluetooth mode) from connectivity processor 212.

An additional distinction between the application processor 230 and low power connectivity processor 212 is the processor architecture of each. Low power connectivity processor 212 is typically a simple microcontroller or network processor having a single core and executing code from low power NOR flash directly from the flash memory 214. The data for the low power processor is held in comparatively small on-chip RAM (such as 32 MB) that is included with the microcontroller or network connectivity processor 212, and this power savings approach limits the processing speed of the connectivity processor 212 and limits the number of supported connections (TCP or Bluetooth) to on the order of 10 connections. The low power connectivity processor 212 typically has a pipeline or CPU clock rate which is on the order of 100 Mhz, or alternatively, less than 1/10th the clock or pipeline rate of the high performance application processor 230. The operating system for the low power connectivity processor 212 is a single thread simple OS Real Time Operating System (RTOS) such as freeRTOS, which handles a comparatively small number of tasks on a single threaded processor (or a processor with a small number of threads, less than 2 or 3), whereas the operating system for the high performance application processor 230 is multi-threaded, supporting at least twice as many threads as the low power connectivity processor 212, and typically on the order of thousands or more connections than connectivity processor 212, or alternatively at least two orders of magnitude more connections (such as TCP sockets) than the low power connectivity processor 212.

Application processor 230 is a multi-core high performance processor coupled to a large DDR (high speed) RAM with is on the order of 16 GB to 32 GBGB or RAM, the application processor 230 having 6-10 pipeline stages, or alternatively at least twice as many as the low power processor 213. The high performance application processor 230 is coupled to a large NAND flash memory of 16 GB or more for program storage, which is typically 2-3 orders of magnitude greater than the on-chip memory of low power connectivity processor 212, has a clock rate which is at least 10× the clock rate of the low power connectivity processor 212, and uses a rich multi-featured operating system such as Android OS, Apple iOS, Linux, or other multi-threaded operating system.

In one example of the invention, the ultra-low power connectivity processor 212 is integrated as a subsystem of the high performance application processor 230, where each of the low power connectivity front end 204, high performance connectivity front end 222, low power connectivity processor 212, high performance application processor 230 and associated peripherals can be separately enabled and powered for selective power savings.

In a preferred mode of operation, the wireless connectivity system 200 of FIG. 2 enables only low power connectivity system 202 for incoming and outgoing network connections. If the required connection exceeds the capability or capacity of the low power connectivity system 202, the high performance connectivity front end 222 and application processor 230 are enabled for only the required duration of time to service the task requiring its capability, after which the high performance connectivity front end 222 and application processor 230 are powered down and operation resumes with the low power transceiver 202.

In one example of the invention, 1×1 WLAN communications are handled by the low power connectivity front end 204 and MAC layer data (via 217) or TCP data (via 216) are handled by the high performance application processor 230.

In another example of the invention, the ultra-low power connectivity system 202 is operative with 1×1 WLAN communications, and handles up to 10 WLAN connections and also performs TCP termination and TCP/TLS SSL connections using low power connectivity processor 212 such that the high performance application processor 230 is not enabled for these types of connections.

In another example of the invention, low power connectivity SOC 202 handles Bluetooth communications and high performance connectivity SOC handles all WLAN connections.

In another example of the invention, 2×2, 3×3 and 4×4 MIMO communications are handled exclusively by the high performance connectivity front end 222 and application processor 230, and other types of connections are handled by the low power connectivity front end 204 and low power connectivity processor 212.

In another example of the invention, the low power connectivity front end 204 handles 1×1 WLAN communications, and the high performance application processor is enabled for only brief intervals sufficient to establish secure WLAN connections (such as the security supplicant task), TCP/TLS and SSL connection establishment, or other connection setup or teardown functions beyond the capability of the low power connectivity processor 212, and the application processor 230 is disabled for all other operations.

FIG. 2 shows a connection architecture which provides connectivity using a minimal power consumption for any configuration, and for any networking protocol such as WLAN which has high performance modes and low performance modes, each protocol having a low power and low performance transceiver such as 202 and a high performance transceiver such as 220. Each of 204, 212/214, 222, and 230/232 are separately enabled using minimum power consumption metrics to satisfy the tasks at hand.

FIG. 3 shows a block diagram for a processor architecture for handling application layer tasks as an extension of the network processing of FIG. 2. Identically numbered references correspond to the function performed by the reference number in the other figures. Low power network connectivity processor 212 is now coupled to a low power application processor 302, which has "mini-" versions representing subsets of functions provided by the application programs and processes of the application processor 340, each processor having the corresponding executable code compiled for the instruction set of the applicable processor. An "A" suffix for the drivers 304A to 320A refers to the "mini" functionality for low power application processor 302 and "B" suffix for the full function high performance application processor 340. The 'B' suffix code (executable program) is preferably stored in high performance NAND flash of application processor 340, and the 'A' suffix code is preferably stored in the execute-in-place (XIP) NOR flash of application processor 302. Because of the low processing overhead for Bluetooth communications within the capability of Application processor 302, FIG. 3 shows Bluetooth driver 308 present for low power application processor 302 only. Mini-WLAN driver 304A handles only network parameters associated with the supported protocols of low power connectivity front end 204, while WLAN driver 304B handles the full network stack for high performance connectivity front end 222, including a configuration which uses interface 217. Mini-TCP/IP stack 306A supports on the order of 10 network connections, whereas full TCP/IP Stack 306B supports on the order of thousands of network connections. Similarly, the respective security supplicants 310A and 310B, network management 312A and 312B, audio and display drivers 314A and B provide respective interface functionality that allows the low power application processor 302 or high performance application processor 340 to control display/touchscreen 330 and audio/sensors 332.

The applications handled by low power application processor 302 and high performance application processor 340 are distinct in operation from the operations associated with the "A" and "B" drivers. Incoming network packets to the low power connectivity front end 204 handled by low power network connectivity processor 212 may be of a notification nature and providing information to display 336 (with or without a required touchscreen 336 response), and the response may invoke additional tasks which are beyond the capability of low power application processor 302. For example, in the case of a wearable watch (or mobile phone), an incoming text message may result in a notification presented by the low power application processor 330 to the display touchscreen 330. If the text message is answered on the wearable, this may be handled by the low power application processor and mini-app such as 316A, whereas if the message includes a video or other task requiring high computational performance beyond the application processor 302 capability, the low power application processor 302 may wake up the high performance application processor 340, which receives the notification via interface 334 and takes over the task until completion. The same handoff may occur on the network layer between 204/212 and 222/340. Each application 316A, 318A, 320A will be divided into "mini" (computationally simple) aspects which are in the capability of, and performed by the low power application processor 302, and aspects which are handled by the high performance processor 340, typically selected on the basis of being with or beyond the CPU capacity of the low power application processor 302. This method saves power because the low power processor 302 has less than 1/10th of the processing capability of the application processor 340 as measured by at least one of: speed of execution, size of RAM memory, stage clock speed, or size of flash storage.

In the block diagram of FIG. 3, either the low power application processor 302 or the high performance application processor 340 may write to the display 336 or read the touchscreen 336, or present audio 332 or read a sensor 332. In this manner, the "A" suffix "mini" application and "B" suffix full applications each are able to access peripherals associated with their respective capability and available tasks, such as the display/touchscreen and sound/sensors of the system of FIG. 3, with the low power application processor 302 handling as many tasks as possible, thereby saving considerable power compared to the architecture of FIG. 1 where the application processor handled all tasks. An examination of typical application use by the inventors shows that out of a 24 hour interval, the low power application processor 302 is able to handle 90% or more of the tasks, consuming approximately 1/5th of the power of the application processor 340, and the high performance (and greater power consumption) processor 340 is available when needed for the remaining 10% or less of time processing tasks, resulting in no loss of performance while reducing power consumption. The high performance processor is ordinarily powered down until needed, with power controller 341 controlling the application of power to the high performance (and high power consumption) processor 340, high performance connectivity front end 222, and associate components, such that they are powered up and enabled only when required. Similar power savings are in effect with 204/212 and 222/340 based on network requirements.

In a music application, the music may be stored in NAND flash 334 by the high performance application processor during an earlier download, such as by adding the music tracks to a digital library stored in NAND flash 334. In a music player mini-application 318A, the low power application processor 302 may periodically read from the NAND flash 334 to buffer music, since the NAND flash 334 consumes negligible power, thereby providing very low power consumption during the music player operation using exclusively the low power application processor 302. The low power application processor 302 and mini-application 318A may then completely run the music player application, including showing the selected song and providing music controls (play, skip, go back, etc.) via touchscreen 336 and direct interface.

Other 'mini' applications can handle incoming notifications using the Wi-Fi interface over the low power connectivity front end 204 and low power connectivity processor 212, including text messages, chats, or phone calls, all of which can be exclusively performed using the low power application processor 302 and associated mini-application rather than the fully featured version operative on the high performance application processor 340, preferably with the low power WLAN/BT interface 204 and low power connectivity processor 212.

In another example of the invention, an additional LTE or 3G/4G wireless telephony interface (not shown) may be interfaced to low power connector network connectivity processor 212 for use with low power application processor 302. In this example, the LTE/3G/4G telephone interface may operate using the low power application processor 302 and associated mini-app 320A for the phone call, and activate the high performance application processor 340 and associated full app 320B for a video call or other high CPU utilization task which is beyond the capability of low power application processor 302.

FIG. 4 shows a series of examples operating on a mobile phone 401 which includes connectivity processor 403, display/touchscreen 405, and application processor 407 is shown in a powerdown state. Mobile phone 401 receives a Facebook notification 402 such as via SISO WLAN, which is handled by connectivity processor 403 which sends a display notification 404 to a touchscreen 405. In this example, the mobile phone user does not react to the notification, and not further action is taken. The mobile phone receives a text message 406, which is displayed 408, and the user may use the touchscreen 405 to formulate a reply, which is sent 412 and transmitted (not shown) by mobile phone 401. An incoming phone call 414 is directed to connectivity processor 403, which displays the caller number 416 as a form of notification. The operator may decline the call 418, which is handled by the low power connectivity processor 403, and the declination 420 is handled by the mobile phone 401. A subsequent phone call 422 displays a caller ID 424, and accepted 426, which causes the connectivity processor 403 to apply power to and wake 452 the application processor 407 and send call related context 428 to the application processor 407. This example shows just one aspect of operation, where the notifications and display functions are handled by the low power connectivity processor 403, and tasks requiring greater computational capacity are handled by the application processor 407. In one example of the invention, each process related to a task has a mini-process (such as display tasks 416 and 424) which is operable on the connectivity processor 403 (corresponding to 212 of FIG. 3) and a high computational demand process (such as 428) which is operable on the application processor (corresponding to 340 of FIG. 3) having sufficient computational capability to handle the associated process.

In the present invention, an 'order of magnitude' indicates a values which may be 10× larger or ¹⁄₁₀th of the nominal value. 'Approximately' or 'in the range of' is understood to be +/−50% of the nominal value.

We claim:

1. A task processor comprising:
   a low power connectivity processor operative to process wireless packets;
   a low power front end comprising a first baseband processor operative to receive wireless packets coupled to a first Media Access Controller (MAC);
   an applications processor;
   a performance front end comprising a second baseband processor operative to receive wireless packets coupled to a second MAC;
   a power controller operative to apply power to the low power connectivity processor and also operative to apply power to the applications processor;
   a plurality of executable tasks, each executable task associated with a computational complexity and an indicator for whether the task is to be executed by the connectivity processor or on the applications processor;
   the power controller examining a wireless packet received on the first MAC, associating at least one of the plurality of tasks to the handling of the packet, at least one task causing power to be applied to the applications processor and performance front end for handling of subsequently received packets;
   the at least one task handled by the application processor comprising tasks performing Multiple Input Multiple Output (MIMO) communications;
   and where the performance front end is enabled for a performance packet type of a particular protocol having a maximum available data transfer rate in excess of 100 Mbps, and the low power front end is enabled for the particular protocol when the packet type has a maximum available data transfer rate less then 100 Mbps;
   and where the connectivity processor has a single core, less than ¹⁄₁₀th of a processing capability, and less than ⅓ of a power consumption of the application processor.

2. The task processor of claim 1 where at least one of the plurality of tasks is operative to process Bluetooth wireless packets and at least one of the plurality of tasks is operative to process Wireless Local Area Network (WLAN) packets.

3. The task processor of claim 1 where at least one task of the plurality of tasks is operative to process at one of: 802.11n, 802.11ac, 802.11ax, or 802.11be packets, and the at least one task is operative to execute only on the applications processor.

4. The task processor of claim 1 where at least one task is operative only on the connectivity processor and the at least one task is operative to execute at least one of: an audio notification, a display notification, audio playback controls, or video playback controls.

5. The task processor of claim 1 where the application processor has at least ten times the computational capacity of the connection processor.

6. The task processor of claim 1 where at least one task is operative to execute on the connection processor to handle network layer or transport layer communications.

7. The task processor of claim 6 where the at least one different task handles an application sending and receiving data from the network layer or the transport layer.

8. The task processor of claim 1 where the performance front end is operative to transmit and receive Bluetooth or Multiple Input Multiple Output (MIMO) wireless packets.

9. The task processor of claim 1 where the low power front end is operative to transmit and receive Bluetooth or wireless packets which are not Multiple Input Multiple Output (MIMO) wireless packets.

10. A task processor comprising:
    a low power connectivity processor operative to process wireless packets;
    a low power front end comprising a first baseband processor operative to receive wireless packets coupled to a first Media Access Controller (MAC);
    an applications processor;
    a performance front end comprising a second baseband processor operative to receive wireless packets coupled to a second MAC, the low power front end and performance front end configured to receive wireless packets of same protocol type but different performance packet type;
    a power controller coupled to the low power connectivity processor and to the applications processor;
    a plurality of tasks, each task having a connectivity processor component operative to execute on the connectivity processor and provide a notification and an application component operative to execute on the application processor and perform a task associated with the notification;
    where the performance front end is enabled for performance wireless packets with a maximum available data transfer rate of 100 Mbps;
    and where, for each task operative to execute on the application processor, a mini-task with reduced functionality is operative to execute on the connectivity processor, the mini-task including at least: wireless packet retransmission tasks and notification tasks;
    the connectivity processor having less than ¹⁄₁₀th of the processing capability and less than ⅓ of the power consumption of the application processor.

11. The task processor of claim 10 where at least one task is a text task having a text message notification operative on the connectivity processor and a text message response operative on the application processor.

12. The task processor of claim 10 where at least one tasks is a Bluetooth task having a network layer component operative on the connectivity processor and an application layer component operative on the application processor.

13. The task processor of claim 10 where at least one task has a component operative to execute on the connectivity processor and a related task operative to execute on the application processor.

14. The task processor of claim 10 where the connectivity processor is at least one of a Cortex-M® processor, an ARM® processor, or a processor configured to use a RISC-V architecture.

15. The task processor of claim 10 where the connectivity processor is operative to execute tasks directly from an execute in place (XIP) NOR flash.

16. The task processor of claim 10 where the application processor is operative to execute tasks from synchronous dynamic Random Access Memory (SDRAM).

17. A process operative on a communication system comprising a low power connectivity processor operative to process wireless packets, a low power front end comprising a first baseband processor operative to receive wireless packets coupled to a first Media Access Controller (MAC), an applications processor, a performance front end comprising a second baseband processor operative to receive wireless packets coupled to a second MAC, a power controller coupled to the low power connectivity processor and to the applications processor, and a plurality of processes having a connectivity processer component and an applications processor component, the process comprising:

the connectivity processor processing an incoming packet to determine whether a notification process should execute or an application process should execute, the connectivity processor also making a determination of whether an incoming packet is a performance packet with a maximum available data rate greater than 100 Mbps and thereafter enabling the application processor and performing the processing of performance packets on the application processor;

upon determination that a notification process should execute, the notification process being executed by the connectivity processor while the application processor is powered down;

upon determination that a load of the connectivity processor exceeds a threshold, powering up the application processor and directing packets to the application processor for processing;

upon determination that the application process should execute, the connectivity processor causing the power controller to apply power to the application processor, the application processor thereafter executing the application process.

18. The process of claim 17 where the process is a text message and the application process is a text message response process.

19. The process of claim 17 where the process is a video or music playback process, and the notification process is a video or music control dialog and the application process is a video or music player.

20. The process of claim 17 where the process is an application which has a communication layer and a display layer, and the communication layer is operative on the connectivity processor and the display layer is operative on the application processor.

21. The process of claim 17 where the process is an email application, the email application having a notification process operative on the connectivity processor and a compose, view, or send process operative on the applications processor.

* * * * *